INVENTOR.
DAVID E. KENYON
BY
ATTORNEY

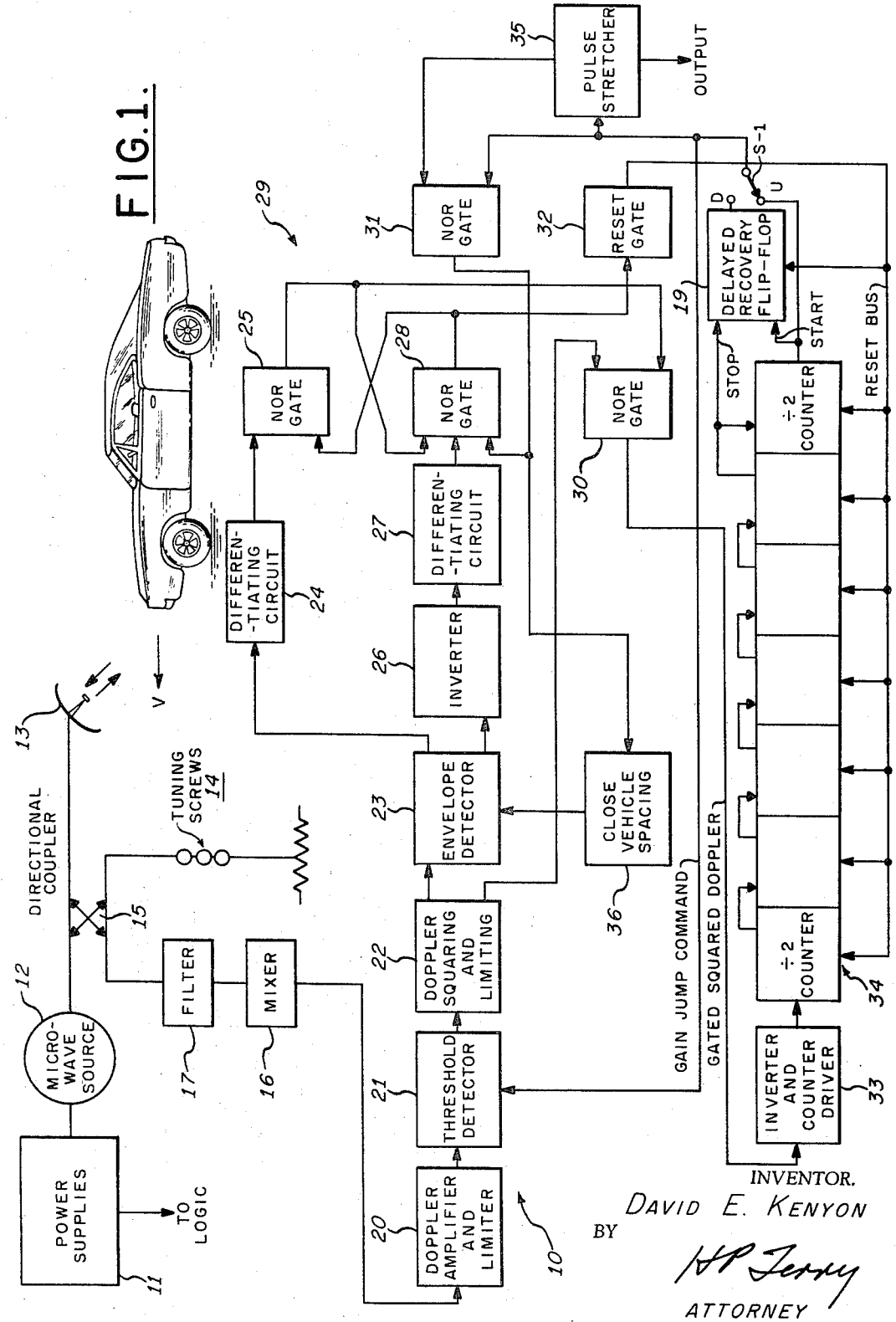

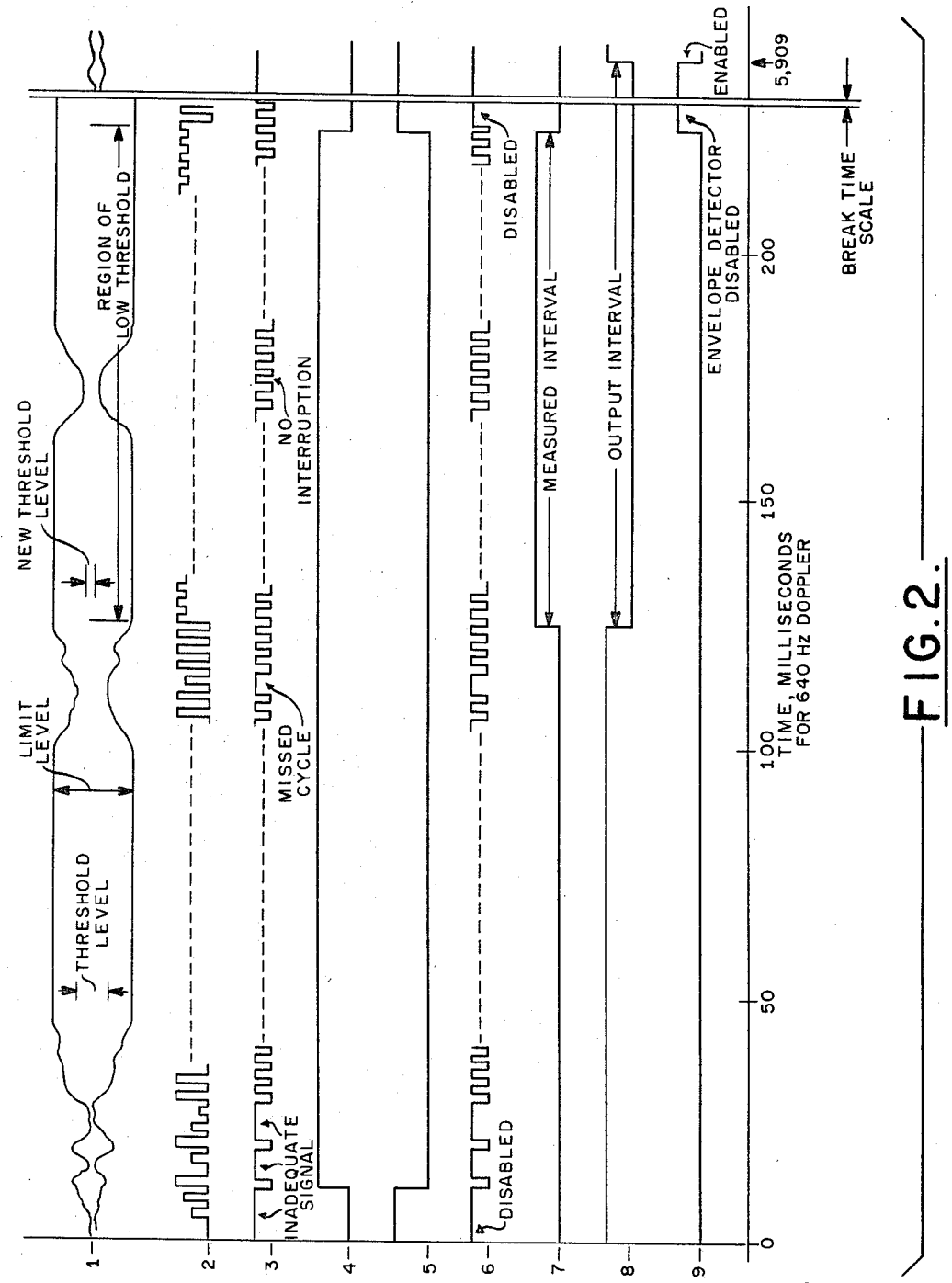

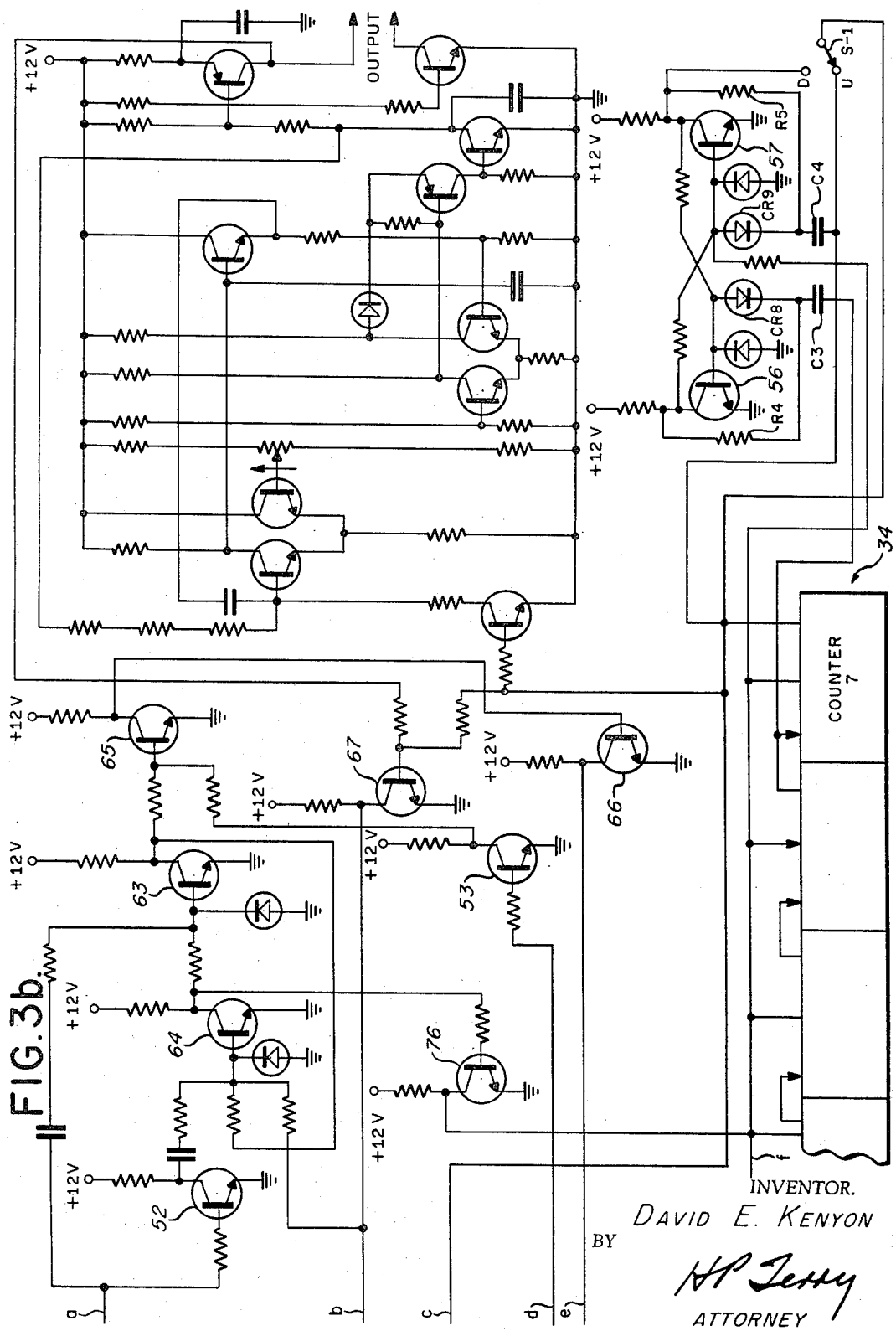

United States Patent Office 3,422,429
Patented Jan. 14, 1969

3,422,429
VEHICLE SENSING AND VELOCITY MEASURING APPARATUS RESPONSIVE TO VEHICLES MOVING ALONG A TRAFFIC PATH
David E. Kenyon, Huntington, N.Y., assignor to Sperry Rand Corporation, a corporation of Delaware
Filed Oct. 9, 1967, Ser. No. 673,654
U.S. Cl. 343—8                                                13 Claims
Int. Cl. G01s 9/44; G08g 1/00; G06g 7/78

ABSTRACT OF THE DISCLOSURE

A Doppler radar type of vehicle sensing and velocity measuring apparatus which provides signals representative of the presence and speed of vehicles travelling along traffic paths.

BACKGROUND OF THE INVENTION

Field of the invention

The invention pertains to traffic control or indicating apparatus for sensing the presence and velocity of vehicles travelling along prescribed traffic paths.

Description of the prior art

Prior-art Doppler type of vehicle sensing and velocity measuring apparatus generally do not provide the sensitivity and accuracy necessary for modern computer-centered traffic control systems. The wide variations in automobile configurations combined with varying ambient weather conditions result in wide fluctuations in the effective Doppler radar automobile signature signals thereby causing erroneous measurements of the velocity of the sensed vehicle. Certain other variations in the radar cross-section are caused by multiple reflections which may partially cancel one another in a manner described as "glint" in the radar art to the exent that certain return signals are rendered ineffective. Another problem of prior art vehicle sensing and velocity measuring apparatus results in erroneous readings when closely spaced vehicles traverse the sensing area. Inaccurate measurements result when both of the vehicles are in the detection zone simultaneously. The prior art devices are also subject to error when vehicles change lanes at the detection zone or other extraneous objects pass through the detection zone which do not constitute a vehicular target. Further, the prior art devices are not adaptable to selectively measure approaching or receding traffic.

SUMMARY OF THE INVENTION

The present invention accurately measures vehicle velocity and presence in spite of vacillating Doppler radar return signals from the vehicular target by first requiring the vehicle to present itself to the sensor in a manner acceptable for the speed determination and secondly by substantially increasing the effective sensitivity of the sensor beyond its original detection sensitivity without introducing transients. Additional apparatus is provided for the rejection of abortive readings such as might result from vehicles changing lanes in the detection zone and other extraneous objects passing through the Doppler radar field which do not consitute bona fide targets. Additional circuitry is provided to insure the accurate measurement of vehicles which may be so closely spaced as to be located in the detection zone at the same time. Structure is also provided to measure extremely long vehicles equivalent to a multiple of a standard vehicle in terms of that multiple. The present invention is also capable of selectively measuring approaching (upstream) or receding (downstream) vehicles.

BRIEF DESCRIPTION OF THE DRAWINGS

FIG. 1 is a simplified block diagram of a vehicle sensing and velocity measuring system in accordance with the present invention;

FIG. 2 is a series of waveforms used in describing the operation of the system illustrated in FIGS. 1 and 3a and b with respect to approaching traffic; and FIG. 3a and FIG. 3b in combination comprise a schematic circuit diagram of a portion of the system of FIG. 1.

DESCRIPTION OF THE PREFERRED EMBODIMENT

Figure 3A:
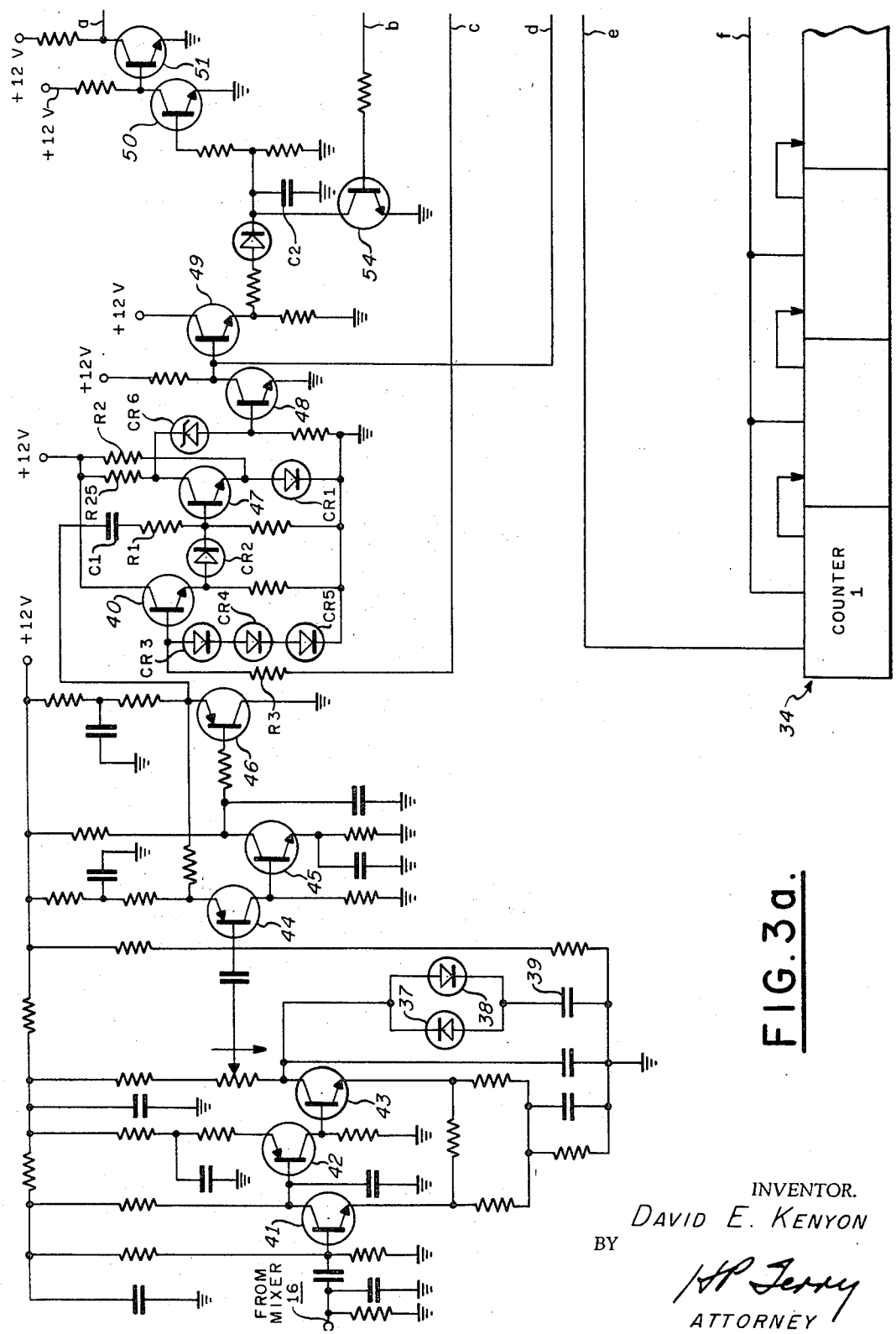

The apparatus for obtaining the signals representative of the presence and velocity of a moving vehicle is shown in block form in FIG. 1 wherein an approaching automobile is indicated to be moving along a prescribed traffic lane with a velocity V. The system 10 of the present invention includes a power supply 11 which provides power to a microwave source 12 as well as to the electronic circuitry of the remainder of the system 10. The microwave source 12 may be either a klystron tube or a solid state device which feeds a common, transmit-receive antenna 13 and a tunable termination 14 through a directional coupler 15. The transmitter-hybrid-receiver antenna constitutes a conventional low power CW Doppler radar which has a specially shaped narrow beam for single traffic lane discrimination with an operating frequency of 10,525 mHz, for example, corresponding to X-band operation. The antenna 13 is mounted above the particular traffic lane and preferably boresighted to dip downwardly from the horizontal by an angle which may be typically 45° and may be responsive to both upstream (approaching vehicles) and downstream (receding vehicles) traffic. As a vehicle approaches the antenna 13 in the traffic lane under surveillance, the transmitted radar signal is reflected back to the antenna 13 and divided between the microwave source 12 and a crystal mixer 16, the latter through the directional coupler 15 and a filter 17 which is tuned to the operating frequency and has adequate rejection of neighboring radar bands to provide against crystal burnout caused by extraneous signals. The tuned termination 14 reflects the proper amount of transmitter power for local oscillator injection to the mixer 16 while providing amplitude and phase adjustment to compensate for antenna mismatch and direct leakage of transmitter power into the mixer port of the hybrid directional coupler 15. The mixer 16 may function in a zero intermediate frequency mode.

With the approach of a vehicle within the coverage area of the radar, a Doppler signal of fluctuating amplitude is provided from the mixer 16 which corresponds to the Doppler beat note between the received and transmitted signal. The output of the mixer 16 is coupled to a Doppler amplifier and limiter 20 where it is amplified in an audio frequency feedback amplifier having a gain sufficient to raise the level of the Doppler signal from the crystal mixer 16 to the level required to actuate a threshold detector 21 when a vehicle signal is present. Typically, the amplifier gain is adjustable up to 5,000 for example. The amplifier 20 has low noise properties and a limited output of 6 volts peak-to-peak with quick recovery after being limited. The Doppler signal output envelope from the Doppler amplifier 20 is shown in FIG. 2 as waveform 1 in conjunction with the two threshold levels of the threshold detector 21. The threshold detector 21 has two distinct levels of detection and initially provides a 2.4 volt peak-to-peak threshold, for example, for detection of the Doppler signal which is switched upon command in a manner to be explained to 0.6 volt peak-to-peak, for example. The output of the threshold detector 21, including the effect of gain jump, is shown with respect to waveforms 1 and 2 of FIG. 2. The individual cycle pulses shown in waveforms 2, 3 and 6 of FIG. 2 have been expanded by a time factor of two for purposes of clarity.

The threshold detector 21 shapes the Doppler signal into a square wave which is connected to a Doppler squaring and limiting circuit 22, the output of which is shown as waveform 3 of FIG. 2. An envelope detector 23 is responsive to the squared Doppler signal and detects the Doppler envelope corresponding to values of input signal in excess of the predetermined threshold values and provides a square pulse representative of the rectangular detected envelope indicated as waveform 4 in FIG. 2. One output of the envelope detector 23 is connected through a differentiating circuit 24 which differentiates the leading edge of the envelope detector signal to serve as a turn-on trigger or start signal for a NOR gate 25. Another output of the envelope detector 23 is connected through an inverter circuit 26 and then a differentiating circuit 27 which differentiates the trailing edge of the envelope detector output to provide a turn-off trigger or stop signal for a NOR gate 28. The NOR gates 25 and 28 as well as NOR gates 30, 31 and 32 consitute a main gate logic circuit 29, one output of which is coupled to an inverter and counter driver 33 and thence to a counter 34. The output of the counter 34 is selectively directly connected to further logic elements described below through a selector switch S–1 when the latter is in the "upstream" position as shown so as to measure approaching traffic. In the event that this apparatus is installed for the measurement of receding vehicles, the switch S–1 is placed in the "downstream" position, in which case the counter 34 is connected to the logic elements via a delayed-recovery flip-flop 19 which operates in a manner to be described. The following description assumes the switch S–1 is placed in the upstream position as shown. The purpose of the main gate logic 29 is to enable the Doppler signals of threshold level or above to be accumulated in the counter 34 during a preliminary 64 count of Doppler cycles and also during the measurement interval of the subsequent 64 Doppler cycles. At the termination of the count of 128 cycles, further counting of the Doppler cycles is interrupted until processing of the speed data is completed, in a manner to be more fully explained.

When the leading edge of the envelope detector output signal shown in waveform 4 of FIG. 2 triggers the NOR gate 25, it becomes conductive thereby causing the cross-connected NOR gate 28 to become non-conductive. While the NOR gate 25 conducts and provides an output signal as shown in waveform 5 of FIG. 2 to the NOR gate 30, the NOR gate 30 which is also responsive to the ungated squared Doppler signals from the output of the Doppler squaring and limiting circuit 22 is conditioned to pass the gated squared Doppler waveform 6 of FIG. 2 to the inverter and counter driver 33 and thence in turn to the counter 34. The counter 34 is a seven-stage binary counter. During this time, the reset gate 32 is disabled thereby removing the reset signal from the counter 34 which allows the counter 34 to accumulate a count.

In the processing of approaching vehicle Doppler signals, with the switch S–1 in the upstream position, the counter 34 will now accumulate 64 valid cycle counts whereupon the output of the counter 34 will abruptly rise from zero to a positive value such as 10 volts, as shown in waveform 7 of FIG. 2. This provides a gain jump command signal to the threshold detector 21 which reduces the acceptance level of the threshold detector 21 by a factor such as four to enhance the detectability of the Doppler signals as shown with respect to waveforms 1 and 2 of FIG. 2. The next 64 Doppler cycles are now counted in the counter 34. The duration of the second 64 counts is measured as a pulse, the length of which is inversely proportional to vehicle speed as shown by waveform 7 of FIG. 2. This pulse also provides a measure of vehicle presence since there is one pulse per vehicle for a standard sized vehicle.

During the interim of counting the second 64 counts, the vehicle has progressed a fixed distance of approximately 51 inches assuming the frequency and dip angle given above. The gain jump command signal changing the threshold of the threshold detector 21 remains in effect until the count of 128 pulses. At the count of 128 pulses, the output voltage from the counter 34 returns to zero. The measured interval pulse generated by the counter 34 may be utilized directly, for example, in a surveillance roadside radar unit or may be connected to an analog pulse stretcher circuit 35 to provide a stretched output interval pulse, as shown by waveform 8 in FIG. 2. The stretched output pulse from the pulse stretcher 35 may then be rendered compatible with traffic control systems. The pulse stretcher circuit 35 may be generally of the type shown in U.S. patent application S.N. 450,652 entitled Pulse Width Multiplying Circuit Having Capacitive Feedback of Harry F. Strenglein, filed Apr. 26, 1965 and now U.S. Patent No. 3,346,743; assigned to the same assignee as the present invention.

At the count of 128 pulses, the simultaneous zero output voltages from the counter 34 and one output of the pulse stretcher 35 actuate the NOR gate 31 to discharge the charge in the envelope detector 23 via the close vehicle spacing circuit 36. The signal from the NOR gate 31, shown as waveform 9 in FIG. 2, also renders the NOR gate 28 conductive thereby closing the NOR gate 30 to inhibit further Doppler cycles from reaching the counter 34. The output of the NOR gate 28 also actuates the reset gate 32 to return the counter 34 to zero. Thus, at this point in time, the Doppler pulse input to the counter 34 is interrupted, the counter is reset and the measured interval pulse, shown as waveform 7 in FIG. 2, is processed in the pulse stretcher 35 to provide an output interval signal, shown as waveform 8 in FIG. 2, having a period corresponding to the passage of the vehicle through 25 feet, for example, thereby providing compatibility with computational devices in traffic control systems. At the end of this output interval signal, the system is restored to its normal state to wait for another vehicle.

In the event that a vehicle or other extraneous target produces an abortive count of less than 64 cycles by virtue of changing traffic lanes or for any other reason, the corresponding waveform 4 of FIG. 2 will be aborted and will reverse the process through the inverter 26 thereby triggering the NOR gate 28 which resets the main gate logic and no output signal results.

If at the termination of the output interval pulse from the pulse stretcher 35, a second vehicle is already within the sensor's detection zone, there would then be no leading edge from the envelope detector output signal from the envelope detector 23 to reactivate the main gate logic. In this event, the action of the NOR gate 31 and the close vehicle spacing circuit 36 will provide for the reactivation of the envelope detector 23 and produce normal gating action although the vehicles are closely spaced, in a manner to be more fully described with respect to FIG. 3.

It will be recognized that the initial 64 counts of Doppler signal represents not a fixed time interval but rather a fixed distance of vehicle travel within the microwave beam. For this reason, the geometry of the situation at the time of actual speed measurement is substantially constant and independent of vehicle speed. This feature avoids the systematic errors which would be a function of vehicle velocity should a fixed waiting interval be substituted for the preliminary 64 cycle count.

The Doppler frequency processed by the sensor logic at the time of actual speed measurement may be expressed as follows:

$$fd = \frac{2v}{\tau} \cos \alpha$$

where $fd$ is the Doppler frequency in Hz.

$v$ is the velocity of the vehicle in cm./sec.

$\tau$ is the microwave wavelength in cm., and $\alpha$ is the actual angle of the target vehicle below the horizontal measured at the sensor antenna. This may or may not exactly correspond to the boresight dip angle.

Thus the need for the accurate positioning of the vehicle with respect to the sensor at the time of speed measurement can be fully appreciated.

The choice of 64 cycles of waiting time for approaching traffic and an equal count during speed measurement is not subject to objective analytical determination because of the great variety of vehicles, each with its own peculiar radar target characteristics, which must be accurately measured. The choice of 64 cycles for upstream or approaching traffic was made after the processing of literally thousands of vehicle records corresponding to a varied traffic mix on a public highway.

Referring now to FIG. 3 for a description of the operation of the detailed circuitry of the system of FIG. 1, upon the passage of a vehicle through the sensing zone of the antenna 13 of FIG. 1 Doppler cycles appear at the output of the mixer 16 in the form of audio signals of substantially sinusoidal waveform that are amplified in the Doppler amplifier preamplifier comprising transistors 41, 42 and 43 to a level suitable for limiting. The limiter portion of the Doppler amplifier includes the diodes 37 and 38 and a capacitor 39 which connect the collector of the transistor 43 to ground potential. After symmetrically clipping the preamplified signal, the power amplifier comprising transistors 44, 45 and 46 amplifies the signal to a level sufficient to drive the succeeding threshold and envelope detector. The threshold detector including transistor 40 allows signals above 2.4 volts peak-to-peak to pass to the envelope detector. The envelope detector includes transistors 47 through 53 which detect the incoming signals and forms a gate pulse shown as waveform 4 of FIG. 2 whose length essentially corresponds to the Doppler envelope. The leading and trailing edges of the gate pulse are used to trigger the main gate logic between its two states. The leading edge triggers the main gate logic open, thus allowing Doppler pulses to reach the counter 34 and the trailing edge triggers the main gate logic closed to inhibit the passage of the Doppler pulses. The envelope detector is designed so that its detection function may be inhibited. The step threshold detector drops from 2.4 volts peak-to-peak to 0.6 volt peak-to-peak upon receiving a gain jump command signal from the counter 34 via switch S-1 for a duration of time equal to the measurement interval of 64 Doppler cycles, and in manner to be explained.

The gain pump command does not alter the gain of the Doppler amplifier 20 since to do so would introduce undesirable transients in the system. Instead, the gain jump command signal from the counter 34 is connected to the threshold detector 21 to reduce the detection threshold by a factor of four, for example, from Doppler count 64 to count 128 for the approaching traffic situation being described whereupon the original threshold is restored. The effect is the same as increasing the Doppler amplifier gain by the same factor but no transients are introduced since the alteration of threshold level is accomplished through a change in the lower or more negative clipping level and particularly since this change is always made at such a time that the instantaneous Doppler signal incident to the threshold detector is resting at the opposite or more positive clipping level, as described in greater detail below.

The ouput of the Doppler amplifier 20 from the transistor 46 is applied to the base of the transistor 47 of the threshold detector 21 via a DC blocking capacitor C1 and a resistor R1 to provide an impedance of 3.9K, for example. The emitter of the transistor 47 rests at 0.6 volt by virtue of the diode CR1 and resistor R2. Therefore, the transistor 47 conducts when its base reaches +1.2 volts. Negative excursions of the Doppler signal are clipped at −1.2 volts through the diode CR2 and the emitter-base junction potential of the transistor 40 when its base is grounded to the normally very low potential at the output of the counter 34. Therefore, the clipping level of the threshold is 2.4 volts peak-to-peak. Upon completion of the count of 64 Doppler cycles, the output of the counter 34 jumps to +10 volts, approximately. The Doppler signal at the base of the transistor 47 is positive at this instant, otherwise the 64th count could not have taken place. By virtue of the impedance of the resistor R3 and the junction potentials of the diodes CR3, 4 and 5, the base of the transistor 40 abruptly rises to +1.8 volts and the emitter to +1.2 volts. The drop in the diode CR2 now sets the lower clipping level at the base of the transistor 47 to +0.6 volt which is the potential of its emitter. Thus the new threshold level of 0.6 volt peak-to-peak is established without affecting the conduction of the transistor 47 and no transients are introduced into its output. Effectively, then, the gain of the Doppler amplifier-threshold detector combination has been quadrupled and remains in this state until the 128th Doppler count whereupon the output of the counter 34 returns to its quiescent state of zero output and original conditions are restored. The function of the Zener diode CR6 is to drop the minimum potential of the collector of the transistor 47 from 0.6 volt (at which point the transistor 48 would be conducting) to zero at the base of transistor 48 for normal operation of the transistor 48 and further grounded-emitter stages.

The main gate logic which includes transistors 63 through 67 permits or interrupts the flow of shaped Doppler cycles between the Doppler output of the envelope detector 23 and the counter 34. It also provides a command to initiate reset of the counter 34 to its zero position upon closure of the main gate.

The main gate logic functions are achieved as follows. A dual input NOR gate 63 and a three input NOR gate 64 are interconnected to form a flip-flop. The NOR gate 63 is receptive to the start signal from the envelope detector and continues in the gate open condition. The output of the NOR gate 63 becomes one input of a second dual input NOR gate 65 which also accepts shaped Doppler from the Doppler clipping elements of the envelope detector. The output of the NOR gate 65 is gated Doppler to the counter 34. The three input NOR gate 64 also supplies a signal to the reset gate 32 which includes a transistor 76. Upon application of an input signal, a current is immediately driven into the base of the transistor 76 turning it on and holding its collector at ground potential. When the input signal is removed, the transistor 76 shuts off and its collector voltage rises. The three input NOR gate 64 is actuated by the stop signal from the envelope detector and can be held closed via its third input by a further NOR gate 67 having two inputs originating at the output of the counter chain 34 and the output of the pulse stretcher 35. The NOR gate 67 generates the normal reset command upon the termination of each speed measurement.

As explained above, upon a start signal from the envelope detector 23 signalling the presence of an acceptable Doppler burst, the main gate logic opens passing Doppler square waves to be accumulated in the counter 34. As shown in waveform 1 of FIG. 2, there may be brief interruptions as the Doppler amplitude varies but experience has shown that after 64 Doppler counts have accumulated with respect to an approaching vehicle, the Doppler signal may be expected to remain above the reduced threshold level. After another 64 Doppler count, inputs from the counter output and simultaneously from the pulse stretcher are such that reset of the main gate is achieved through its third input and so held until the termination of the stretched gate. The system is now ready to process another vehicle.

If an abortive Doppler signal of less than 64 cycles is received, the main gate closes and initiates reset of the counter 34 such that no vehicle is read. This closure and reset does not occur unless the loss of signal exceeds 40 milliseconds.

The counter 34 comprises seven identical flip-flop circuits arranged so that in the zero count or reset condition, the right hand transistor in each stage is essentially ground. The counter responds to input signals received from the main gate until at the count of 64 cycles, the output terminal of the last counter rises to +10 volts. Upon further inputs to the count of 128 pulses, the output of the final counter again returns to zero. The counter 34 is reset to zero and held in this condition by the application of a positive potential of +5 volts or greater from the reset gate 32. It will be understood that the foregoing description and mention of Doppler cycle counts refer to the upstream mode of operation of this device for the measurement of approaching traffic.

The pulse stretcher 35 is an analog data processing circuit which accepts a positive measured interval rectangular pulse shown as waveform 7 of FIG. 2 coming from the counter 34 and provides an output interval pulse shown as waveform 8 in FIG. 2, which is a replica of the input interval multiplied by a constant factor to be compatible with the system within which it is to be used. The principles and detailed operation of the pulse stretcher 35 are explained in said U.S. patent application S.N. 450,652 and consequently only a brief description is provided herein. In operation, upon receipt of the start of the unstretched gate, a Miller run-up circuit charges a capacitor at a fixed rate. Upon termination of the unstretched gate this charging cycle ceases and the process reverses itself, the capacitor now being discharged at another but slower fixed rate. The time, measured in seconds, between the initiation of the charge cycle and the completion of the discharge cycle is a duration equal to $17/V$, where $V$ equals the speed of the vehicle in miles per hour.

In the event that two vehicles are spaced so closely in traffic that the second vehicle has entered the radar beam before the pulse stretcher 35 has completed processing the speed of the first vehicle, the main gate circuit 29 could not be normally reactivated by the arrival of the second vehicle, since they are held in an inactive condition by the proper action of the NOR gate 31. This situation is circumvented by the close vehicle spacing circuit 36 embodying transistor 54 of FIG. 3 and its associated components.

The close vehicle circuit operates as follows. As long as the pulse stretcher 35 is in operation, the two input NOR gate 31, i.e., transistor 67 of FIG. 3, is non-conductive, thus maintaining the main gate 29 in the off or blocked state and at the same time holding capacitor C2 in a discharged condition by virtue of the conductive state of the transistor 54, although a second vehicle may enter the radar beam. However, upon the termination of the gate stretching operation, the transistor 67 again conducts, removing the blocking signal from the main gate 29 and at the same time rendering the transistor 54 non-conductive, so that the capacitor C2 may charge rapidly to a positive potential and allow the envelope detector 23 to present a leading edge trigger to the transistor 64. Thus, the second vehicle is detected and its speed measured in the normal manner.

A very long vehicle will provide a Doppler signature of the same nature as that produced by two or more closely spaced vehicles. Therefore, trucks and other long commercial vehicles will be processed by this apparatus as though each consisted of a string of normal automobiles, closely spaced. The resulting output to the traffic control computer is correspondingly rendered more realistic in terms of actual roadway use than if these vehicles were presented as integral units without regard to their physical length.

The foregoing description has been predicated upon the placement of this apparatus in such a manner as to face the oncoming traffic to be counted and measured regarding speed. In this orientation, particularly where the apparatus is installed overhead with the radar beam depressed towards the roadway, it will be seen that antenna sidelobes in the vertical plane will have little effect upon the detection of the vehicle at the proper distance to assure a speed measurement taken with the correct geometry regarding vehicle and apparatus, since the upper sidelobes are traversed by the vehicle at a range too great for detection, whereas the lower sidelobes are traversed during the inactive period after the speed measurement has been made and during which the pulse stretcher 35 is processing the speed data for use by the computer.

However, circumstances sometimes require that the apparatus be placed so as to detect and perform measurements upon traffic moving in the opposite direction, that is, moving away from the apparatus after having passed beneath it. In this event, the effect of the lower antenna sidelobes is most pronounced, since these are traversed while the apparatus is ready for detection. As a result, a preliminary count of 64 Doppler cycles before the speed measurement is inadequate and results in a speed measurement that is unreliable, since this measurements is made at an excessive dip angle below the horizontal emphasizing the phenomenon of "glint" as this effect is termed in the radar art.

It has been determined through the study of a large number of records of representative vehicle radar signatures for the downstream mounting of this apparatus that a preliminary count of 128 Doppler cycles followed by a measurement of 64 cycles will provide speed determinations with a high degree of accuracy. As shown in FIG. 1, a delayed-recovery flip-flop circuit 19 is incorporated into this apparatus and employed for the downstream (receding traffic) mode of operation only. The circuit 19 operates in the following manner.

A pair of transistors 56 and 57 are cross-connected in a manner similar to that of a binary counter, except that the two input capacitors C3 and C4 are connected to separate inputs rather than to a common point. In addition, the junction of a steering diode CR8 and the capacitor C3 returns to the collector of the transistor 56 through a resistor R4. A similar arrangement is provided for the transistor 57 with respect to a steering diode CR9, the capacitor C4 and a resistor R5. If the time constant of the combination of the capacitor C3 and the resistor R4 is made sufficiently long, and the same is done with the capacitor C4 and the resistor R5, for example, 100 microseconds or more, then the circuit at rest will change state abruptly upon the receipt of the appropriate trigger but cannot be reversed thereafter until, say, 100 microseconds has elapsed and the steering diode which was blocked by the previous change of state has again resumed a cathode potential appropriate for further triggering. The necessity for this delayed-recovery feature will become apparent.

Referring to FIG. 1, let us assume that downstream traffic is to be measured and that switch S-1 is placed in the downstream condition. All output functions of the final binary unit of counter 34 are now taken over by the delayed-recovery flip-flop 19 except for the initial triggering of the latter circuit. The flip-flop circuit 19 is normally in a reset condition and its output voltage is approximately zero. It will remain in this condition for the duration of 128 Doppler cycle counts as defined by the seven-stage counter 34. Upon completion of 128 counts, however, the final counter provides a trigger pulse to the flip-flop, which abruptly changes state, its output becoming substantially +10 volts. The counter 34 now continues counting and upon the 64th succeeding count, binary unit 6 of counter 34 provides a negative trigger to the flip-flop 19, turning it back to its original or quiescent state, thus ending the interval beginning with count 128 and terminating with count 192. The proper interval has been established.

However, upon count 192, the binary element 6 triggers succeeding element 7 as well as the flip-flop 19. This places element 7 in the wrong or non-reset condition. The trigger pulse thus passed along to the flip-flop 19 is of the wrong polarity to cause it to change state. However, the termination of the measurement interval actuates the reset gate 32, which resets all of the binary elements, including element 7, which then provides a trigger of correct switching polarity. This is done very quickly, so that the false pulse produced by element 7 is of short duration, typically less than 5 microseconds. Since the delayed-recovery flip-flop 19 cannot respond to a trigger pulse until, typically, 100 microseconds has elapsed since its last change of state, it ignores the false pulse and anomalous behavior of the logic elements which the flip-flop 19 actuates is thereby avoided.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. In a continuous wave Doppler radar system for sensing a moving vehicle,
    means including Doppler radar means for directing a beam of microwaves along a path and for receiving microwaves reflected back from said moving body and for combining said transmitted and reflected waves to provide beat frequency waves having a frequency substantially proportional to the speed of said moving vehicle along said path,
    amplifier and amplitude limiter means responsive to said beat frequency waves for providing amplified and limited signals at said beat frequency,
    threshold detector means responsive to said amplified and limited signals for passing said amplified and limited signals in excess of a predetermined threshold value,
    Doppler squaring means responsive to said passed signals for providing squared Doppler signals,
    gating means responsive to said squared Doppler signals for passing said squared Doppler signals,
    counter means responsive to said passed squared Doppler signals for counting a predetermined number to provide an interval signal accurately representative of the velocity of said moving vehicle,
    and said threshold detector means includes threshold switching means responsive to said counter means for establishing a lower threshold value during counting of said predetermined number to provide said interval signal.

2. In a continuous wave Doppler radar system for sensing a moving vehicle,
    means including Doppler radar means for directing a beam of microwaves along a path and for receiving microwaves reflected back from said moving body and for combining said transmitted and reflected waves to provide beat frequency waves having a frequency substantially proportional to the speed of said moving vehicle along said path,
    amplifier and amplitude limiter means responsive to said beat frequency waves for providing amplified and limited signals at said beat frequency,
    threshold detector means responsive to said amplified and limited signals for passing said amplified and limited signals in excess of a predetermined threshold value,
    Doppler squaring means responsive to said passed signals for providing squared Doppler signals,
    gating means responsive to said squared Doppler signals for passing said squared Doppler signals,
    counter means responsive to said passed squared Doppler signals for counting a predetermined number to provide an interval signal accurately representative of the velocity of said moving vehicle,
    envelope detector means responsive to said squared Doppler signals for providing a square pulse whose leading edge represents a start signal and whose trailing edge represents a stop signal,
    and said gating means includes means responsive to said start and stop signals and to said squared Doppler signals for passing said squared Doppler signals between said start and stop signals.

3. In a system of the character recited in claim 2 in which said gating means includes first, second, third and fourth NOR gates and a reset gate,
    said first NOR gate being responsive to said start signal,
    said second NOR gate being responsive to said stop signal, the output of said fourth NOR gate, and being interconnected with said first NOR gate,
    said reset gate being responsive to said second NOR gate and said Doppler squaring means, and coupled to said counter means,
    said fourth NOR gate being responsive to the output of said counter means and to a stretched version of said interval signal, and
    said reset gate being responsive to said second NOR gate and coupled to reset said counter means.

4. In a system of the character recited in claim 3 where in the event the number of said passed squared Doppler signals are less than said predetermined number,
    said envelope detector means provides an abort stop signal in responsive to said number, and
    said second NOR gate is responsive to said abort stop signal for providing an abort signal to said reset gate for resetting said counter means prior to any change of state of said counter means thereby precluding an erroneous velocity signal.

5. In a system of the character recited in claim 2 and further including means for measuring closely spaced vehicles where both vehicles are located in said beam having means for rendering said envelope detecting means effective upon termination of said interval signal to be responsive to the Doppler signals of the succeeding vehicle for providing another interval signal representative of the velocity of said succeeding vehicle.

6. In a continuous wave Doppler radar system for sensing a moving vehicle,
    means including Doppler radar means for directing a beam of microwaves along a path and for receiving microwaves reflected back from said moving body and for combining said transmitted and reflected waves to provide beat frequency waves having a frequency substantially proportonal to the speed of said moving vehicle along said path,
    amplifier and amplitude limiter means responsive to said beat frequency waves for providing amplified and limited signals at said beat frequency,
    threshold detector means responsive to said amplified and limited signals for passing said amplified and limited signals in excess of a predetermined threshold value,
    Doppler squaring means responsive to said passed signals for providing squared Doppler signals,
    gating means responsive to said squared Doppler signals for passing said squared Doppler signals,
    counter means responsive to said passed squared Doppler signals for counting a predetermined number to provide an interval signal accurately representative of the velocity of said moving vehicle,
    and said threshold detector means includes threshold switching means for establishing first and second threshold values,
    said counter means being arranged to count a first predetermined number of said passed squared Dopper signals as said moving vehicle enters said beam in accordance with said first threshold value for providing a first change in state, said first predetermined Doppler signals tending to be erratic and unsuitable for accurate velocity measurement, said threshold switching means being responsive to said first change in state to establish said second threshold value, said second threshold value being substantially lower than that of said first, said counter means being further arranged to count a second predetermined number of said passed squared Doppler signals as said moving vehicle traverses said beam in accordance with said second threshold value for providing a second change in state whereby the interval between said first and second changes in state accurately represents the velocity of said vehicle because the second predetermined number of said Doppler signals tend to be more suitable and in combination with said lower threshold provide more accurate Doppler signals.

7. In a system of the character recited in claim 6 in which said threshold switching means includes means for establishing said first and second threshold values without introducing transients in said system.

8. In a system of the character recited in claim 6 in which with approaching vehicles said counter means is arranged to count a first 64 of said passed squared Doppler signals during which time said beat frequency waves tend to be erratic resulting in missed signals and then to count a second 64 of said passed squared Doppler signals during which time said beat frequency waves tend to be substantially less erratic but still have some undesirable fluctuations.

9. In a system of the character recited in claim 6 in which with receding vehicles said counter means is arranged to count 128 of said passed square Doppler signals during which time said beat frequency waves tend to be erratic resulting in missed signals and then to count 64 of said passed squared Doppler signals during which time said beat frequency waves tend to be substantially less erratic.

10. In a system of the character recited in claim 6 and further including means for measuring long vehicles in terms of multiples of a standard vehicle.

11. In a system of the character recited in claim 6 and further including means for accurately measuring closely spaced vehicles which may be simultaneously located in said beam.

12. In a continuous wave Doppler radar system for sensing a moving vehicle, means including Doppler radar means for directing a beam of microwaves along a path and for receiving microwaves reflected back from said moving body and for combining said transmitted and reflected waves to provide beat frequency waves having a frequency substantially proportonal to the speed of said moving vehicle along said path, amplifier and amplitude limiter means responsive to said beat frequency waves for providing amplified and limited signals at said beat frequency, threshold detector means responsive to said amplified and limited signals for passing said amplified and limited signals in excess of a predetermined threshold value, Doppler squaring means responsive to said passed signals for providing squared Doppler signals, gating means responsive to said squared Doppler signals for passing said squared Doppler signals, counter means responsive to said passed squared Doppler signals for counting a predetermined number to provide an interval signal accurately representative of the velocity of said moving vehicle, and means including switching means coupled to said counter means for rendering said system selectively responsive to ones of approaching and receding vehicles.

13. In a system of the character recited in claim 12 in which said means including switching means further includes means for counting a second group of 64 of said passed squared Doppler signals for providing said interval signal with respect to said approaching vehicles and means for counting a third group of 64 of said passed squared Doppler signals for providing said interval signal with respect to said receding vehicles.

References Cited

UNITED STATES PATENTS 2,878,467   3/1959   Barker et al. _____ 343—8

RODNEY D. BENNETT, *Primary Examiner.*

C. L. WHITHAM, *Assistant Examiner.*

U.S. Cl. X.R.

340—39; 235—150.24